United States Patent [19]

Steinwart

[11] 4,167,921
[45] Sep. 18, 1979

[54] FUEL INJECTION DEVICE FOR INTERNAL COMBUSTION ENGINES

[75] Inventor: Johannes Steinwart, Obersulm-Willsbach, Fed. Rep. of Germany

[73] Assignee: Audi Nsu Auto Union Aktiengesellschaft, Fed. Rep. of Germany

[21] Appl. No.: 850,306

[22] Filed: Nov. 10, 1977

[30] Foreign Application Priority Data

Nov. 13, 1976 [DE] Fed. Rep. of Germany ....... 2651928

[51] Int. Cl.² .............................................. F02B 3/00
[52] U.S. Cl. .............................. 123/32 JV; 123/32 B
[58] Field of Search ............... 123/32 JV, 32 B, 33 C, 123/33 E, 34 R; 239/335, 366, 367, 368, 369, 401

[56] References Cited

U.S. PATENT DOCUMENTS

| | | | |
|---|---|---|---|
| 898,779 | 9/1908 | Plank | 123/33 B |
| 1,609,386 | 12/1926 | Stroeter | 123/33 C |
| 2,033,155 | 3/1936 | Scott | 123/33 B |
| 2,203,669 | 6/1940 | Butler | 123/33 B |
| 2,987,261 | 6/1961 | McCuiston et al. | 239/335 |
| 3,226,035 | 12/1965 | Jokelson | 239/367 |
| 3,232,540 | 2/1966 | Cassanmagnago | 239/335 |
| 3,980,056 | 9/1976 | Kraus | 123/33 E |
| 4,006,719 | 2/1977 | Kanda et al. | 123/32 JV |

FOREIGN PATENT DOCUMENTS

| | | | |
|---|---|---|---|
| 807569 | 3/1969 | Canada | 310/239 |
| 1037550 | 9/1953 | Fed. Rep. of Germany | 123/33 B |
| 9280 | 4/1913 | France | 123/33 C |
| 225846 | 4/1926 | United Kingdom | 123/33 B |

Primary Examiner—Charles J. Myhre
Assistant Examiner—R. A. Nelli
Attorney, Agent, or Firm—Kane, Dalsimer, Kane, Sullivan and Kurucz

[57] ABSTRACT

A fuel injection device for a mixture-compressing internal combustion engine has an induction passage provided with a main throttle element, and also has an injection nozzle including an injection head with a fuel injection opening, and a surrounding air chamber for supplying combustion air, which communicates with atmosphere or other air supply and has an outlet opening aligned with the fuel injection opening and spaced from the injection head.

7 Claims, 4 Drawing Figures

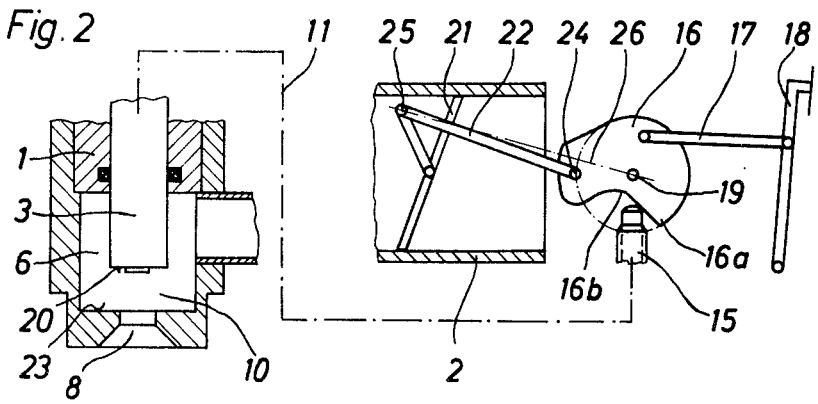
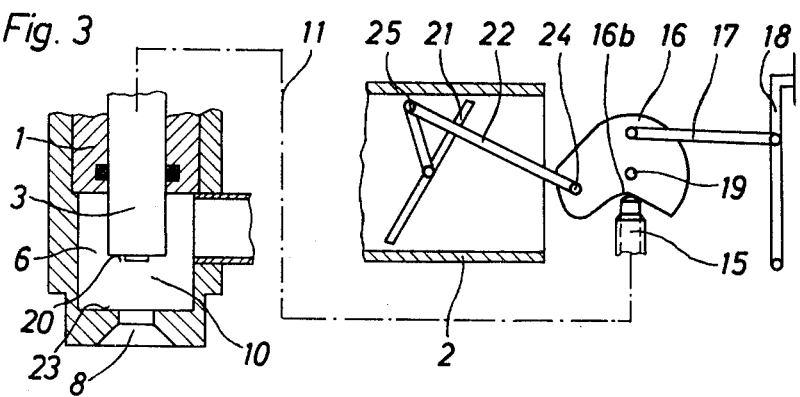
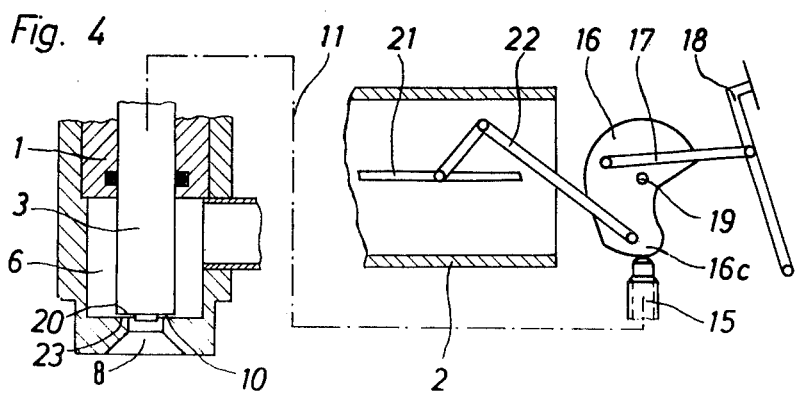

FUEL INJECTION DEVICE FOR INTERNAL COMBUSTION ENGINES

BACKGROUND OF THE INVENTION

In a fuel injection device of the type to which the present invention pertains the fuel that is ejected via the injection opening of the injection nozzle is mixed with a partial air stream from the air chamber and issues from the outlet opening as a fuel-air mixture, either into the induction passage or directly into the working zone of the engine, according to the position of the injection nozzle. In this way it is possible to achieve effective turbulence in the air flow and atomization of the fuel and thus a satisfactory mixture. The air chamber or its communication with the atmosphere, however, may restrict the amount of air which flows through the air chamber to only a fraction of the amount of air required for idle running, the further air requirement being supplied via an idle running adjustment device of the usual type. This means that the proportion of air flowing through the air chamber of the fuel injection device becomes smaller as the load on the internal combustion engine increases, and thus the proportion of the mixture satisfactorily generated by the air chamber of the nozzle also becomes smaller. Since this mixture preparation is limited to such a small operating range, and also because the ejected fuel, in the upper loading range and on full load, may become deposited on the walls inside the air chamber, on account of the usual fall in depression in the induction passage and thus in the region of the injection nozzle, the result may be an increase in fuel consumption and deterioration of the content of the exhaust gas.

SUMMARY OF THE INVENTION

Accordingly, it is an object of the invention to reduce or obviate the drawbacks mentioned and to provide a fuel injection device of the above-mentioned type in which fuel deposition in the air chamber is avoided or reduced over a large part or the whole range of operation.

Broadly stated the invention consists of a fuel injection device for a mixture-compressing internal combustion engine having an induction passage provided with a main throttle element, and also having an injection nozzle including an injection head with a fuel injection opening, and a surrounding air chamber for supplying combustion air, which communicates with atmosphere or other air supply and has an outlet opening aligned with the fuel injection opening and spaced from the injection head, the injection head being adjustable in relation to the air chamber or outlet opening in accordance with the load setting of the engine, so as to provide an adjustable throttle zone or restriction for the combustion air flowing through the outlet opening, whose cross-section is variable between that needed for idle running and that needed for full load, while the main throttle element in the induction passage is effectively or substantially closed at least for idle running, and is increasingly opened as the load setting is increased beyond a selected value.

By means of the invention the injection nozzle with air chamber can act as an air regulating device, so as to achieve intensive atomization and turbulence of the fuel with the air flowing through the air chamber, over a considerably extended range of engine loading. Outside this widened range of loading, when mixture preparation through the air chamber of the injection nozzle is no longer sufficient, the mixture may be generated in the usual manner principally through the relatively fast moving air being drawn in through the induction passage, under these operational conditions.

In order to achieve a satisfactorily prepared fuel-air mixture over at least the major part of the loading range, it is preferable to arrange that the cross-section of the adjustable throttling zone is arranged to increase progressively from the setting for idle running, as the load setting of the engine is increased up to a selected point, and thereafter the cross-section is reduced as the load setting is increased up to full load, and the injection nozzle is connected to the main throttle member in the induction passage such that the throttle member is closed for idle running and remains closed up to the said selected point, and is increasingly opened from the said loading point up to full load, in accordance with the combustion air requirements of the engine.

As a result of this adjustment system, the useful advantage can be obtained that the mixture may be generated exclusively in the air chamber up to a load setting point situated above idle running. In the loading range above this, when the air requirement increases further, mixture preparation in the air chamber may be dispensed with, since it is possible to achieve good turbulence of the injected fuel with the air, as a result of the high velocity of the air flowing in via the induction passage.

According to a preferred feature of the invention, the throttle zone is formed between the end wall of the injection head and the adjacent end wall of the air chamber which includes the outlet opening. By this construction the generation of the fuel-air mixture takes place in the immediate vicinity of the outlet opening, in such a manner that the path of the mixture in the air chamber is shortened and deposition or dissociation of fuel can be effectively prevented.

In a particular preferred construction the injection head has an end wall which is displaceable preogressively away from the opposing end wall of the air chamber as the load setting increases from the idle running position, and is displaceable progressively towards the said end wall from a loading point between idle running and full load, and at full load the two end walls are in direct contact, or the gap between the said end walls is smaller than on idle running.

With this arrangement, in which the mixture for idle running and up to the selected loading point, is prepared in the vicinity of the outlet opening of the air chamber. It is possible, in the loading range above this to shorten the injection path by locating the injection nozzle up against the outlet opening, so that direct injection can take place through the outlet opening. Hence, deposition of fuel in the air chamber in the area of the outlet opening can be avoided, and likewise, in spite of the usual reduction of the depression in the induction passage in this loading range, a good mixture preparation can be achieved.

For adjustment, the injection nozzle and the throttle member may be connected to an actuating member by means of a mechanical and/or hydraulic and/or electric adjustment device.

If a mechanical construction is provided, the adjustment device may include a transmission cam and a cam follower linked to the injection head, the cam being connected also to the actuating member, and to the main throttle member by a control linkage so arranged that on initial actuation from an idle running condition the injection head is adjusted, but the main throttle member is not adjusted appreciably until a selected load setting has been reached.

In order to provide for adjustment of the throttle member that is delayed relative to the adjustment of the injection nozzle as the load setting increases, the linkage can be pivotally connected to the main throttle member and to the transmission cam in such a manner that, in the idle running position of the transmission cam the linkage lies a short distance ahead of an imaginary connecting line between the pivotal axis of the transmission cam and the pivotal connection point between the linkage and the main throttle member.

As a result of the elongated, almost rectilinear path of this linkage, with its pivot points opposite the axis of the transmission cam, the transmission cam may be rotated out of the idling position without initial actuation or opening of the throttle member. Whereas the linkage engaging the transmission cam and connected to the injection nozzle cam is actuated.

The invention may be performed in various ways and one particular embodiment with some possible modifications will now be described in detail with reference to the accompany drawings.

BRIEF DESCRIPTION OF THE DRAWINGS

In the drawings:

FIG. 2 is a partial view of the fuel injection device of FIG. 1 in a modified position of operation;

FIG. 3 is a partial view similar to FIG. 2 in a further modified position of operation; and FIG. 4 is a partial view similar to FIG. 2 in yet a further modified position of operation.

DETAILED DESCRIPTION OF THE PREFERRED EMBODIMENT

Figure 1:
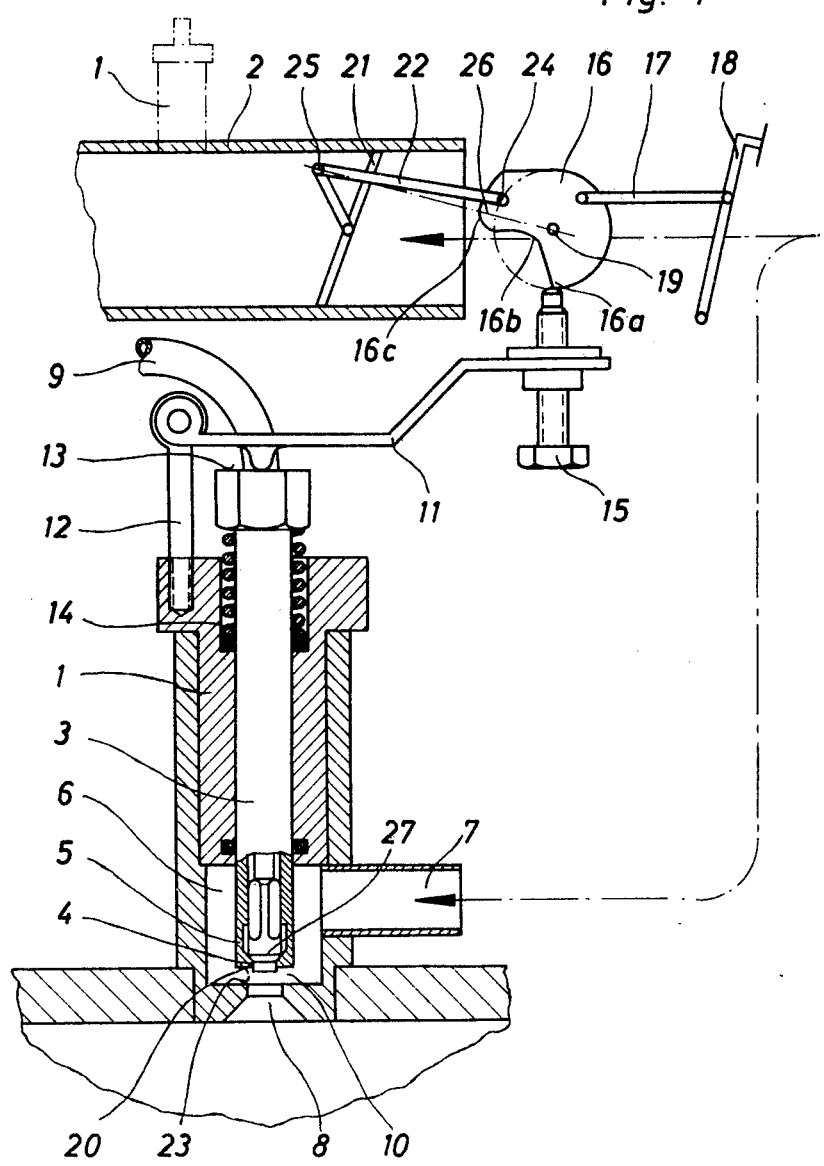
FIG. 1 is a somewhat diagrammatic illustration, partly in section and on an enlarged scale of a fuel injection device and induction passage according to the invention.

Reference will be made first of all to FIG. 1, which illustrates a fuel injection device comprising a nozzle body 1, shown also in enlarged cross-section, and mounted for the sake of example on the induction passage 2 of an internal combustion engine not represented. An injection nozzle 3 is incorporated into the nozzle body 1, this nozzle 3 having an injection head 5 with a fuel injection opening 4 in which a nozzle needle 27 is located, the head 5 being surrounded by an air chamber 6 for supply of combustion air. The air chamber 6 is connected via an air duct 7 with the atmosphere or may open out into the induction passage 2, as shown in chain lines on the drawing. The air chamber 6 is also provided with an outlet opening 8 which is aligned and disposed coaxially with the fuel injection opening 4. The injection nozzle 3, which is supplied with fuel via a fuel duct 9, is mounted in the nozzle body 1 so as to be longitudinally displaceable as a result of which there is formed an adjustable throttle zone 10 between the end wall 20 of the injection head 5 and the opposite end wall 23 of the air chamber 6 which contains the output opening 8.

For adjustment of the injection nozzle 3 a lever 11 is provided, pivotably mounted on a fulcrum pin 12 secured to the nozzle body 1 and the upper surface 13 of the nozzle is pressed against the lever by means of a spring 14. The lever 11 cooperates via a set screw 15 with a diagrammatically shown adjustment mechanism, which consists essentially of a transmission cam 16 having cam surface elements 16a, 16b, 16c, and rotatable about an axis 19 by means of a rod 17 pivotally connected to the transmission cam 16 and to an accelerator pedal 18 forming an actuating member. Pivotally connected to the transmission cam 16, moreover, at point 24 is a rod or linkage 22, which is attached at pivot point 25 to the throttle member 21 mounted in the induction passage 2. The pivot point 24 is so arranged that in the idle running position as shown in FIG. 1 it is situated between the axis 19 and the other pivot point 25 of the rod 22, and also slightly ahead of an imaginary line 26 (shown as a chain line running straight through the pivot point and the axis 19) considered in relation to the anti-clockwise direction of rotation of the transmission cam 16. In some cases the nozzle body 1 may be positioned downstream of the throttle member 21 in the direction of the arrow marked in the induction passage. For better illustration, however, the throttle body 1 has been shown separate from the induction passage.

The position shown in FIG. 1 is assumed by the fuel injection device when the internal combustion engine is operated for idle running. Since the throttle member 21 is closed in this condition, all the air for combustion is drawn in via the air chamber 16 into the passage 2. In the vicinity of the throttling zone 10 the fuel ejected by the injection nozzle 3 mixes with the combustion air, and as a result a mixture with very finely atomized turbulent fuel is produced, which flows into the induction passage via the outlet opening 8. For adjusting and setting the idle running condition or the right fuel-air ratio, the cross-section of the thorttling zone 10 can be regulated by means of the set screw 15 which engages the raised portion 16a of the cam.

In the operational position shown in FIG. 2 the accelerator pedal 18 is partly depressed and the cam 16 is rotated anticlockwise correspondingly, such that the set screw 15 of the lever 11 (which is shown diagrammatically in chain lines) engages the cam surface element 16b, and the injection nozzle 3 moves upwards inside the air chamber 6 as a result of the action of the spring 14. With this movement the pivot point 24 of the linkage 22 is rotated by the transmission cam 16 only to a limited extent, such that no actuation of the throttle member 21 takes place, since the pivot point 24 in this position still lies spproximately between the axis 19 and the pivot point 25 (contrary to the idle running position of FIG. 1) behind the line 26 and also at a slight distance therefrom, and the linkage 22 lies approximately parallel or in line with this line. In this operational position a substantially greater throughflow cross-section is obtained at the throttling zone 10, such that the total combustion air requirement of the engine in this operating position flows through the air chamber 6.

FIG. 3 illustrates another operational position in which the accelerator pedal 17 is depressed still further, and the set screw 15 engages directly in the cam recess 16b. The injection nozzle 3 is lifted further by the lever 11 so that the maximum throughflow cross-section is formed at the throttling zone 10. At the same time, however, the throttle member 21 is also actuated by the rod 22 and slightly opened. In this position the greatest possible amount of air that can be regulated flows from the injection nozzle 3 through the air chamber 6. Also through the gradual opening of the throttle member 21 a smooth stepless transition is achieved for the next stage of air regulation; very efficient preparation therefore occurs also at this operating point situated between idle running and full load, principally at the throttling zone 10.

FIG. 4 shows another operational position in which the load requirement has increased further and the accelerator pedal is fully depressed. The cam 16 has now been rotated anticlockwise to such a distance that the raised cam portion 16c, which is higher than the raised cam portion 16a, engages the set screw 15. At the same time, the throttle member 21 has been fully opened via the rod system 22. In consequence the air requirements of the engine are fed mainly through the induction passage 2, and in addition the front wall 20 of the injection nozzle 3 is pushed so close to the front wall of the air chamber 6 that the throttling zone 10, depending upon the height of the raised cam portion 16c, provides a very small throughflow cross-section or is fully closed. In this operating condition the depression at the outlet opening 8 has usually decreased and therefore fuel mixture generation at the throttling zone 10 loses some of its significance. The injection nozzle 3 injects over a reduced distance directly through the outlet opening 8 into the current of air which flows past rapidly in the induction passage, such, that effective atomization of the fuel for good mixture preparation occurs in the induction passage 2 and at the same time depositions of fuel in the air chamber 6 are avoided.

As the accelerator pedal 18 is depressed and raised to the extent corresponding to the instantaneous loading requirements, further positions, passing smoothly one into the other, are possible between the individual operational positions represented in FIG. 1 to FIG. 4. The whole air intake requirement will be drawn in through the air chamber 6 up to a point for example of 20% to 50% of the full load conditions. Thereafter a proportion of the air flow is increasingly supplied through the induction passage 2, the throughflow cross-section of the throttling zone 10 being reduced and the opening of the throttle member 21 being correspondingly enlarged as the accelerator is depressed. Many deviations from the example illustrated is possible, without departing from the scope of the invention. The air duct 7 and the induction passage 2 may, for example, be connected to the air channel, and the fuel duct 9 to the fuel control port of a standard fuel metering device, which supplies an amount of fuel proportional to the amount of air drawn in. It is also possible for the nozzle body 1 to be disposed in the vicinity of the working cylinders or the inlet ports of an internal combustion engine, instead of on the induction passage 2. Moreover, adjustment of the injection nozzle 3 may be effected by electrical or hydraulic elements, instead of mechanically.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A fuel injection device for a mixture compressing internal combustion engine having an induction passage provided with a main throttle element, and also having an injection nozzle including an injection head with a fuel injection opening, and a surrounding air chamber for supplying combustion air, which communicates with an air supply and has an outlet opening aligned with the fuel injection opening and spaced from the injection head, the injection head being adjustable in accordance with the load setting of the engine, so as to provide adjustable throttling means for the combustion air flowing through the outlet opening, whose cross-section is variable between that needed for idle running and that needed for full load, while the main throttle element in the induction passage is substantially closed at least for idle running, and is increasingly opened as the load setting is increased beyond a selected value.

2. A fuel injection device according to claim 1, in which the cross-section of the adjustable throttling means is arranged to increase progressively from the setting for idle running, as the load setting of the engine is increased up to a selected point, and thereafter the cross-section is reduced as the load setting is increased up to full load, and the injection nozzle is connected to the main throttle member in the induction passage such that the throttle member is closed for idle running and remains closed up to the said selected point, and is increasingly opened from the said loading point up to full load, in accordance with the combustion air requirements of the engine.

3. A fuel injection device according to claim 1 in which the injection head has an end wall, the throttle means defines a zone formed between the end wall of the injection head and the adjacent end wall of the air chamber which includes the outlet opening.

4. A fuel injection device according to claim 3, in which the injection head has an end wall which is displaceable progressively away from the opposing end wall of the air chamber as the load setting increases from the idle running position, and is displaceable progressively towards the said end wall from a loading point between idle running and full load, and at full load the two end walls define a gap between the said end walls that is smaller than that on idle running.

5. A fuel injection device according to claim 1, in which the injection head and the main throttle member are connected to an actuating member by means of an adjustment device.

6. A fuel injection device according to claim 5, in which the adjustment device includes a transmission cam and a cam follower linked to the injection head, the cam being connected also to the actuating member, and to the main throttle member by a control linkage so arranged that on initial actuation from an idle running condition the injection head is adjusted but without appreciably adjusting the main throttle member until a selected load setting has been reached.

7. A fuel injection device according to claim 6, in which the control linkage is pivotally connected to the main throttle member and to the transmission cam in such a manner that, in the idle running position of the transmission cam the linkage lies a short distance ahead of an imaginary connecting line between the pivotal axis of the transmission cam and the pivotal connection point between the linkage and the main throttle member.

* * * * *